US012585079B2

(12) United States Patent　　　　　(10) Patent No.:　US 12,585,079 B2
Kondo et al.　　　　　　　　　　　　　(45) Date of Patent:　　Mar. 24, 2026

(54) LENS DEVICE

(71) Applicant: FUJIFILM Corporation, Tokyo (JP)

(72) Inventors: Nobuyuki Kondo, Saitama (JP);
Mitsuhiko Oka, Saitama (JP); Toshiaki Ezawa, Saitama (JP); Keito Kamio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 399 days.

(21) Appl. No.: 18/470,401

(22) Filed: Sep. 19, 2023

(65) Prior Publication Data

US 2024/0111122 A1　　Apr. 4, 2024

(30) Foreign Application Priority Data

Sep. 29, 2022　(JP) ................................. 2022-157110

(51) Int. Cl.
*G02B 7/02*　　　(2021.01)
*G02B 7/04*　　　(2021.01)
*G03B 17/18*　　(2021.01)

(52) U.S. Cl.
CPC ............. *G02B 7/023* (2013.01); *G02B 7/021* (2013.01); *G02B 7/04* (2013.01); *G03B 17/18* (2013.01)

(58) Field of Classification Search
CPC .......... G02B 7/02; G02B 7/021; G02B 7/022; G02B 7/023; G02B 7/04; G02B 7/08; G02B 7/10; G02B 7/102; G02B 27/646; G03B 5/00; G03B 17/17; G03B 17/14
See application file for complete search history.

(56) References Cited

U.S. PATENT DOCUMENTS

2019/0052781 A1　　2/2019　Kato

FOREIGN PATENT DOCUMENTS

| JP | 2000352735 | | 12/2000 |
|----|------------|---|---------|
| JP | 2010266574 | | 11/2010 |
| JP | 2010266574 | A * | 11/2010 |
| JP | 2019032417 | | 2/2019 |

\* cited by examiner

*Primary Examiner* — Ephrem Z Mebrahtu
(74) *Attorney, Agent, or Firm* — JCIPRNET

(57)　　　　　　ABSTRACT

A lens device includes a fixation portion fixed to a lens mechanism and a rotational movement portion that is connected to the fixation portion to be rotationally movable. One of the fixation portion and the rotational movement portion includes a detection member and the other of the fixation portion and the rotational movement portion includes a detection target member and a substrate. The detection target member includes a body portion including an indicator of rotational movement and a plurality of extending portions extending from the body portion. The plurality of extending portions are connected to the substrate.

18 Claims, 14 Drawing Sheets

LENS DEVICE

CROSS-REFERENCE TO RELATED APPLICATIONS

This application claims priority under 35 USC 119 from Japanese Patent Application No. 2022-157110 filed on Sep. 29, 2022, the disclosure of which is incorporated by reference herein.

BACKGROUND OF THE INVENTION

1. Field of the Invention

The present disclosed technology relates to a lens device.

2. Description of the Related Art

Disclosed in JP2010-266574A is a lens barrel having a function of shifting a lens in a direction orthogonal to an optical axis. The lens barrel includes a first member, a second member, a first in-lens electric circuit board, and a second in-lens electric circuit board. The first member does not move relative to a camera even in a case where the lens is shifted in the direction orthogonal to the optical axis. The second member moves relative to the first member at the time of a shifting operation. The first in-lens electric circuit board is connected to a camera-side circuit. The second in-lens electric circuit board is connected to the first in-lens electric circuit board. The second member is provided with an opening portion for passage of a subject light ray. The first and second electric circuit boards are attached to the second member in a plane orthogonal to the optical axis and are disposed at opposite positions with the opening portion interposed therebetween in a shifting operation direction.

Disclosed in JP2019-032417A is a lens device including a lens, a first base member, and a holding frame that holds the lens and that includes a flange surface intersecting an optical axis of the lens. The first base member is provided with a first inclined surface of which the angle with respect to the flange surface is an acute angle, and the holding frame is fixed to the first base member by an adhesive provided between the first inclined surface and the flange surface.

Disclosed in JP2000-352735A is a stop device that includes a stop unit of which the aperture is variable, a stop presetting unit that presets the stop unit to a set F number, and a stop operating unit that controls an aperture increasing and decreasing operation of the stop unit. The stop operating unit performs an aperture decreasing operation and a locking operation by a first pressing operation and performs an unlocking operation and an aperture increasing operation by a second pressing operation.

SUMMARY OF THE INVENTION

One embodiment according to the present disclosed technology provides a lens device with which it is possible to achieve size reduction in a radial direction in comparison with a structure in which one extending portion extends from a body portion.

A lens device according to a first aspect of the present disclosed technology comprises a fixation portion fixed to a lens mechanism and a rotational movement portion that is connected to the fixation portion to be rotationally movable. One of the fixation portion and the rotational movement portion includes a detection member, the other of the fixation portion and the rotational movement portion includes a detection target member and a substrate, the detection target member includes a body portion including an indicator of rotational movement and a plurality of extending portions extending from the body portion, and the plurality of extending portions are connected to the substrate.

According to a second aspect of the present disclosed technology, in the lens device related to the first aspect, the detection member may include a contact brush, the detection target member may include a flexible flat cable, the indicator may include a conductor pattern that comes into sliding contact with the contact brush, and each of the extending portions may include a connection portion that connects the conductor pattern to the substrate.

According to a third aspect of the present disclosed technology, in the lens device related to the second aspect, the conductor pattern may be a Gray-code-based pattern.

According to a fourth aspect of the present disclosed technology, in the lens device related to the second aspect, the conductor pattern may include a ground line and a plurality of signal lines.

According to a fifth aspect of the present disclosed technology, in the lens device related to the first aspect, the fixation portion may include the detection member, and the rotational movement portion may include the detection target member and the substrate.

According to a sixth aspect of the present disclosed technology, in the lens device related to the first aspect, the plurality of extending portions may include a pair of extending portions that outputs a signal related to the rotational movement.

According to a seventh aspect of the present disclosed technology, in the lens device related to the sixth aspect, a first extending portion of the pair of extending portions may extend from a first end portion of the body portion, and a second extending portion of the pair of extending portions may extend from a second end portion of the body portion.

According to an eighth aspect of the present disclosed technology, in the lens device related to the first aspect, the body portion may extend in a rotational movement direction of the rotational movement portion, and the plurality of extending portions may extend to a central side of the rotational movement portion from the body portion.

According to a ninth aspect of the present disclosed technology, in the lens device related to the first aspect, the detection member may be disposed at a position at which the detection member overlaps with the substrate within a range of rotational movement of the rotational movement portion as seen in a front view from an optical axis direction.

According to a tenth aspect of the present disclosed technology, in the lens device related to the first aspect, the substrate may extend in a rotational movement direction of the rotational movement portion, and a central angle of the substrate may be equal to or smaller than 180°.

According to an eleventh aspect of the present disclosed technology, in the lens device related to the first aspect, the detection target member may include a first region and a second region, and the plurality of extending portions may include a first extending portion corresponding to the first region and a second extending portion corresponding to the second region.

According to a twelfth aspect of the present disclosed technology, in the lens device related to the eleventh aspect, the first region and the second region may be determined based on the number of divisions of the indicator.

According to a thirteenth aspect of the present disclosed technology, in the lens device related to the twelfth aspect, the number of divisions may be equal to or greater than 30 and equal to or smaller than 62.

According to a fourteenth aspect of the present disclosed technology, in the lens device related to the first aspect, an angle by which the rotational movement portion is rotationally movable may be equal to or greater than 45° and equal to or smaller than 135°.

According to a fifteenth aspect of the present disclosed technology, in the lens device related to the first aspect, an angle by which the rotational movement portion is rotationally movable may be 90°.

According to a sixteenth aspect of the present disclosed technology, in the lens device related to the second aspect, the conductor pattern may include a ground line and a plurality of signal lines, and the ground line or the signal line may be divided into a first line and a second line.

According to a seventeenth aspect of the present disclosed technology, in the lens device related to the sixteenth aspect, the first line and the second line may partially overlap with each other in a rotational movement direction of the rotational movement portion.

According to an eighteenth aspect of the present disclosed technology, the lens device related to the first aspect may further include the lens mechanism, a tilt mechanism that tilts the lens mechanism, a shift mechanism that shifts the lens mechanism, and a rotation mechanism that rotates at least one of the tilt mechanism or the shift mechanism around an optical axis direction.

DESCRIPTION OF THE PREFERRED EMBODIMENTS

In the description of the present specification, the meaning of "being orthogonal" includes not only "being completely orthogonal" but also "being orthogonal with an error generally acceptable in a technical field to which the present disclosed technology belongs to an extent that is not inconsistent with the gist of the present disclosed technology". In the description of the present specification, the meaning of "being parallel with each other" includes not only "being completely parallel with each other" but also "being parallel with each other with an error generally acceptable in a technical field to which the present disclosed technology belongs to an extent that is not inconsistent with the gist of the present disclosed technology". In the description of the present specification, the meaning of "being at equal intervals" includes not only "being at equal intervals" but also "being at equal intervals with an error generally acceptable in a technical field to which the present disclosed technology belongs to an extent that is not inconsistent with the gist of the present disclosed technology".

First, the configuration of an imaging apparatus 10 according to an embodiment of the present disclosure will be described.

Figure 1:
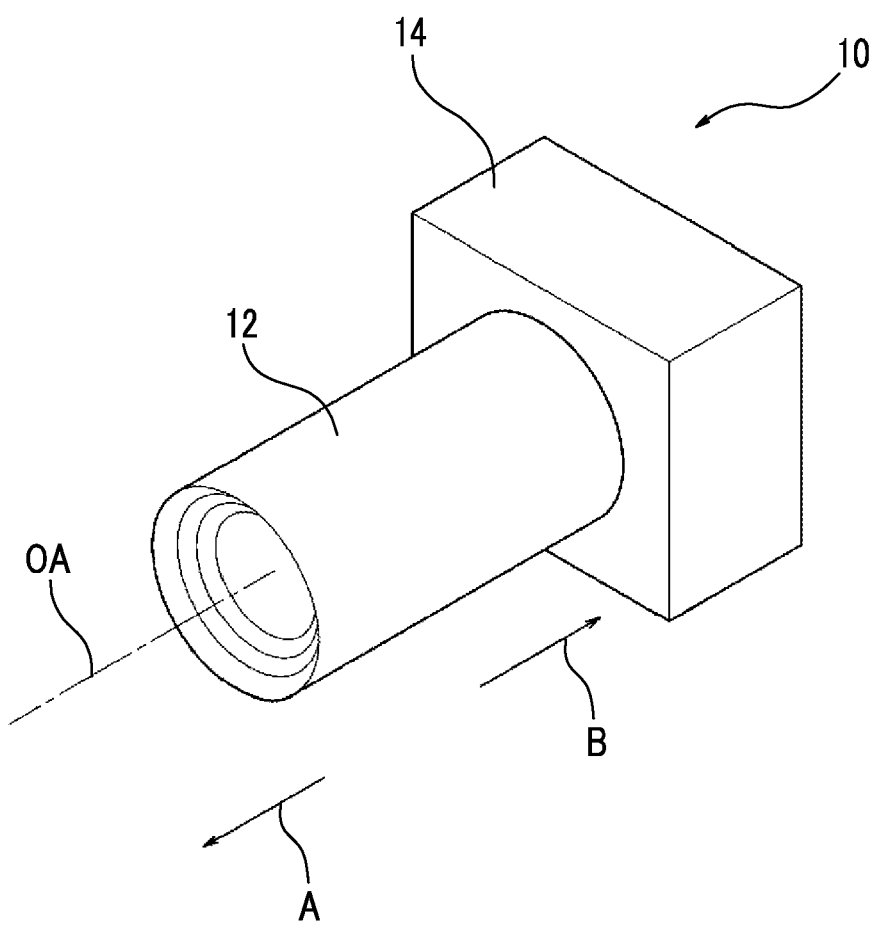
FIG. 1 is a perspective view showing an example of an imaging apparatus.

FIG. 1 shows a perspective view of the imaging apparatus 10 according to the present embodiment. For example, the imaging apparatus 10 includes a lens device 12 and an imaging apparatus body 14 as shown in FIG. 1. The lens device 12 is provided at a front portion of the imaging apparatus body 14. In FIG. 1, the lens device 12 and the imaging apparatus body 14 are schematically shown. An image sensor (not shown), a computer (not shown), and the like are built into the imaging apparatus body 14. Regarding the lens device 12, an arrow A side is an object side, and an arrow B side is an image formation side. An optical axis OA is an optical axis of the lens device 12. Hereinafter, an axial direction along the optical axis OA will be referred to as an "optical axis direction".

Figure 2:
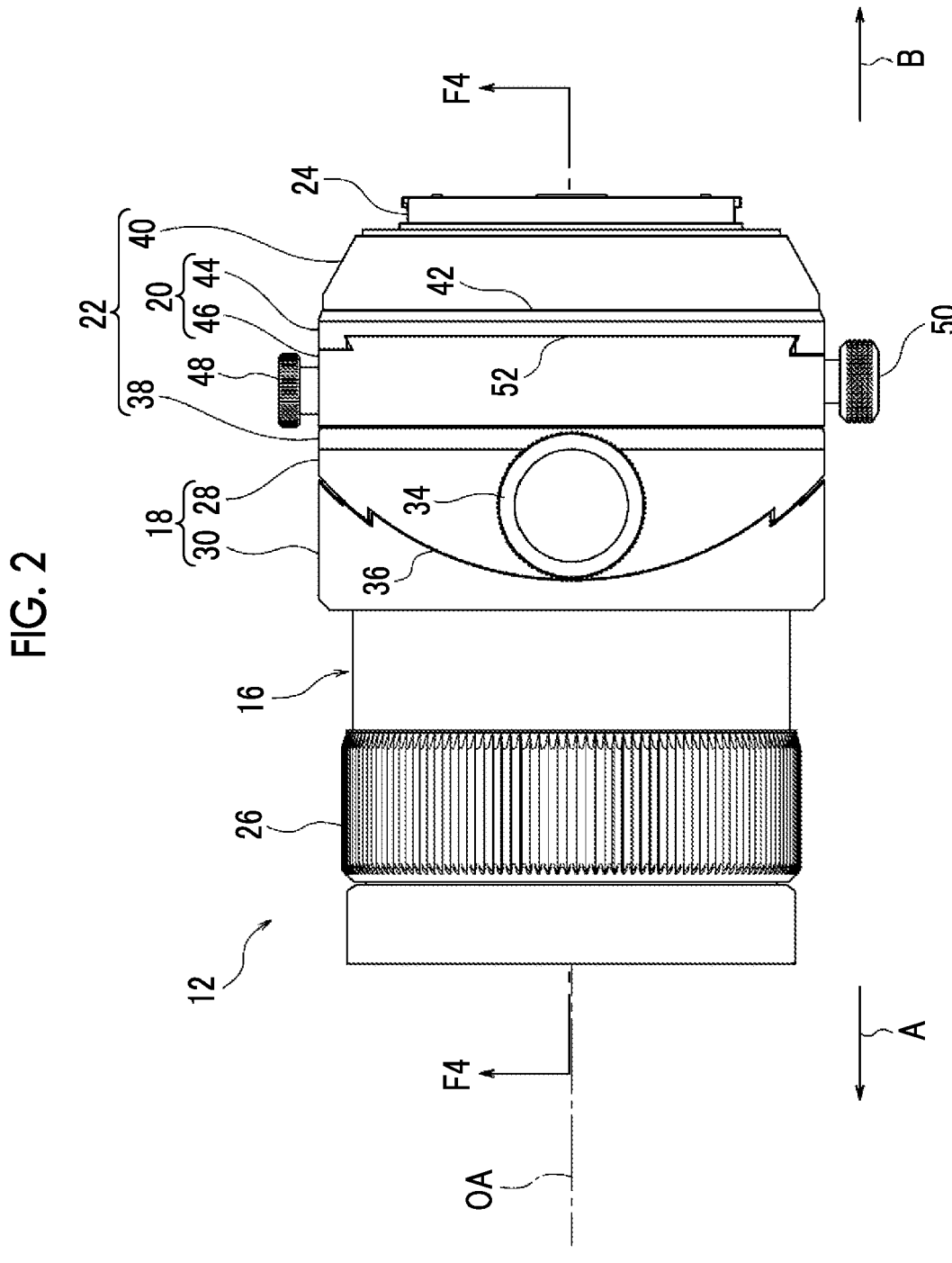
FIG. 2 is a plan view showing an example of a lens device.
Figure 3:
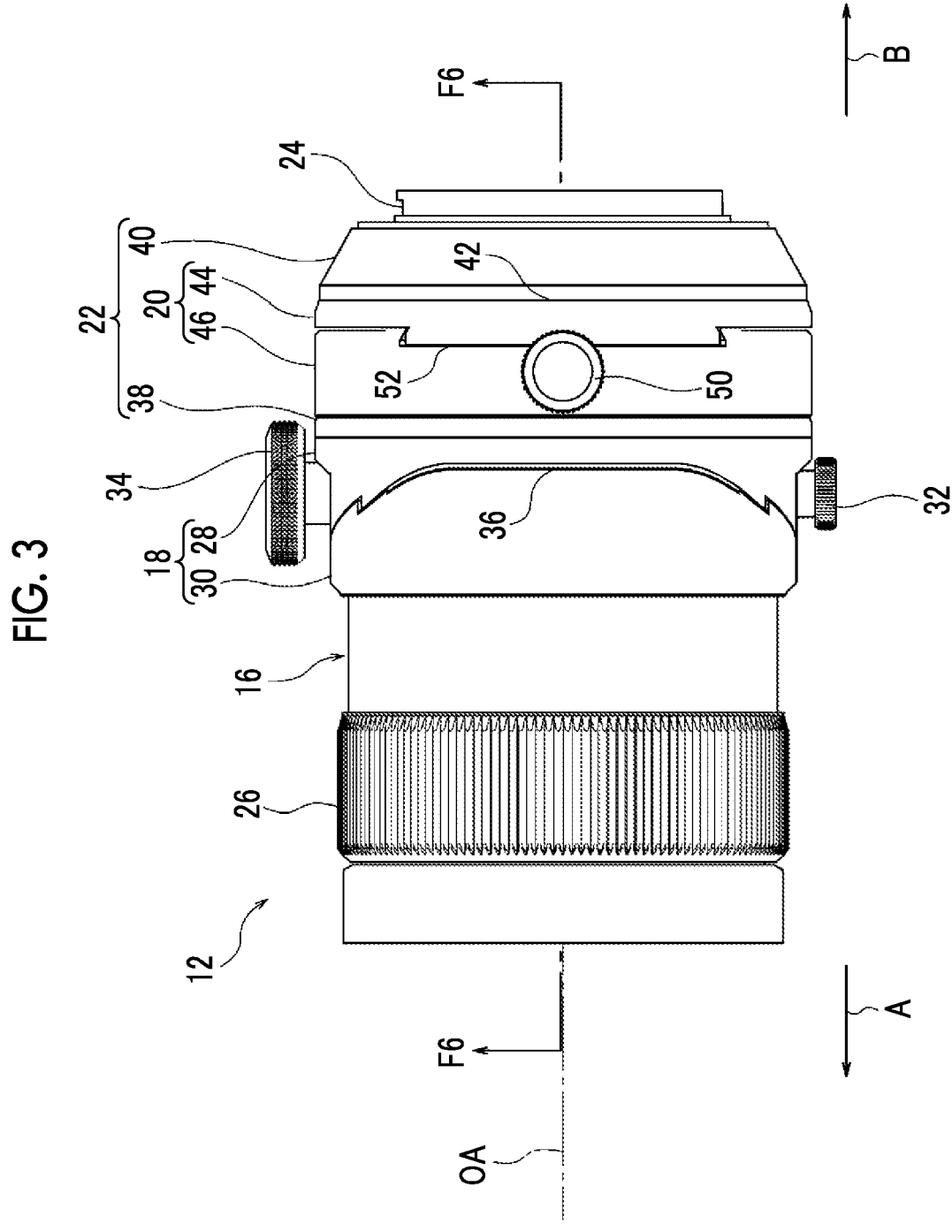
FIG. 3 is a side view showing an example of the lens device.
Figure 4:
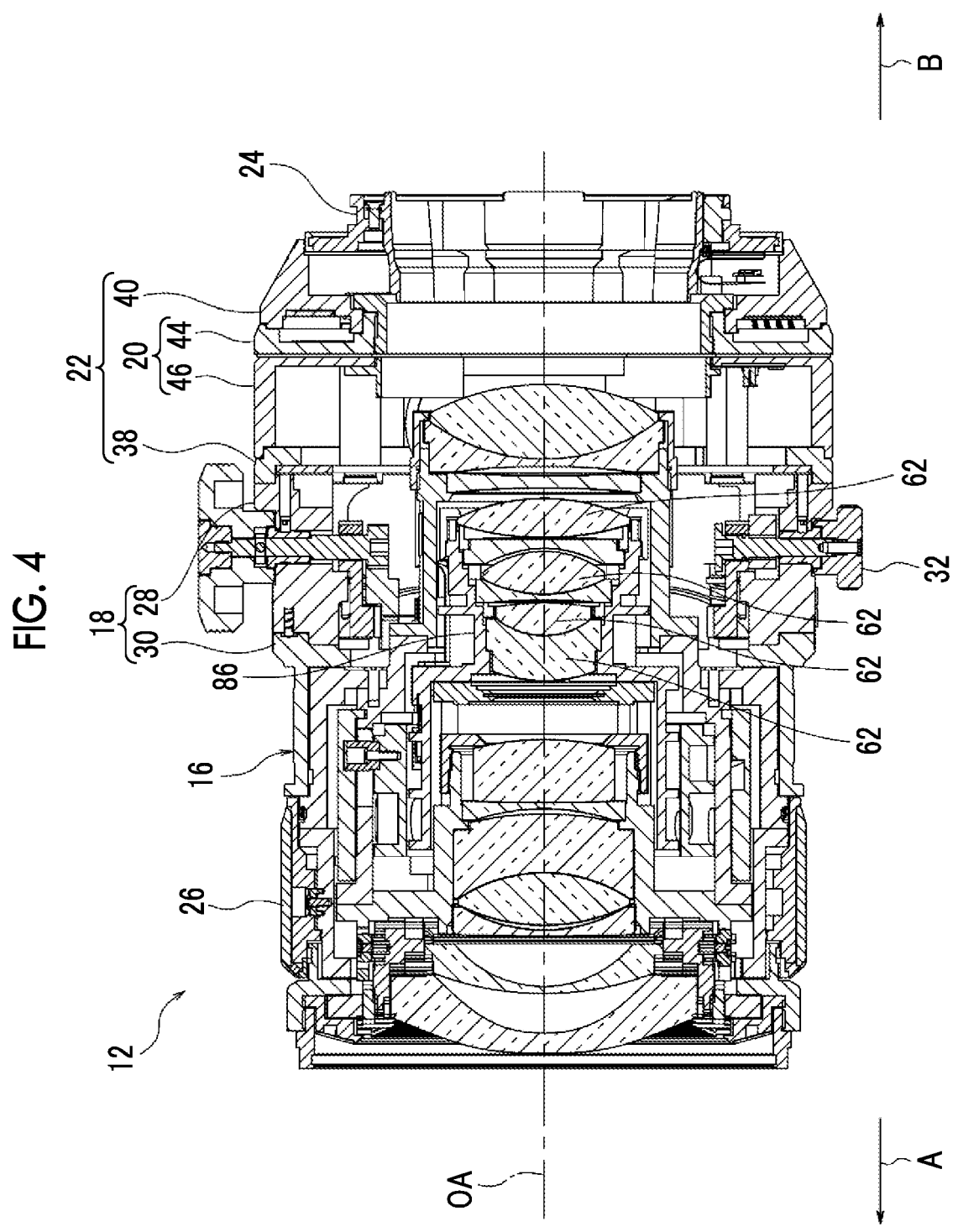
FIG. 4 is a cross-sectional view showing an example of the lens device.

FIG. 2 shows a plan view of the lens device 12 and FIG. 3 shows a side view of the lens device 12. In addition, FIG. 4 shows a cross-sectional view of the lens device 12 which is taken along line F4-F4 in FIG. 2. For example, as shown in FIGS. 2 to 4, the lens device 12 includes a lens mechanism 16, a tilt mechanism 18, a shift mechanism 20, a revolving mechanism 22, and a mount 24.

The lens mechanism 16 includes a focus ring 26. The focus ring 26 is formed around the optical axis direction in a ring-like shape. The focus ring 26 can rotate around the optical axis direction.

The tilt mechanism 18 is a mechanism that tilts the lens mechanism 16. The tilt mechanism 18 includes a tilt base 28, a tilt stage 30, a tilt lock 32, and a tilt knob 34. A boundary 36 is a boundary between the tilt base 28 and the tilt stage 30. The boundary 36 is formed in an arc-like shape while being centered on a tilt shaft (not shown) orthogonal to the optical axis OA. The tilt mechanism 18 acts with the boundary 36 as a starting point.

The tilt stage 30 is disposed closer to the object side than the tilt base 28 is. The tilt stage 30 is fixed to the lens mechanism 16. The tilt base 28 supports the tilt stage 30 such that the tilt stage 30 can tilt. The meaning of "to tilt" is an operation of rotating about the tilt shaft. The tilt stage 30 tilts integrally with the lens mechanism 16.

The tilt lock 32 and the tilt knob 34 are shaft-shaped members. The tilt lock 32 is disposed with an axial direction of the tilt lock 32 being parallel with an axial direction of the tilt shaft. Similarly, the tilt knob 34 is disposed with an axial direction of the tilt knob 34 being parallel with the axial direction of the tilt shaft. The tilt lock 32 and the tilt knob 34 are provided at the tilt base 28.

The tilt lock 32 is a member that can switch between a locking state in which the tilt stage 30 is fixed to the tilt base 28 and an unlocking state in which the tilt stage 30 is allowed to tilt. The tilt knob 34 is a member that tilts the tilt stage 30. For example, a rack-and-pinion mechanism (not shown) is provided between the tilt knob 34 and the tilt stage 30 and the tilt stage 30 tilts by an amount corresponding to the amount of rotation of the tilt knob 34.

The revolving mechanism 22 is a mechanism that rotates the lens mechanism 16, the tilt mechanism 18, and the shift mechanism 20. The revolving mechanism 22 includes a revolving stage 38 and a revolving base 40. A boundary 42 is a boundary between the revolving base 40 and a shift base 44 which will be described later. The boundary 42 is formed along a plane orthogonal to the optical axis OA. The revolving mechanism 22 acts with the boundary 42 as a starting point.

The revolving stage 38 is disposed closer to the image formation side than the tilt base 28 is. The revolving stage 38 is fixed to the tilt base 28. The revolving base 40 is disposed closer to the image formation side than the shift base 44 is. The revolving base 40 supports the shift base 44 to be rotatable around the optical axis direction. The lens mechanism 16, the tilt mechanism 18, the revolving stage 38, and the shift mechanism 20 integrally rotate with each other around the optical axis direction. The lens mechanism 16, the tilt mechanism 18, the revolving stage 38, and the shift mechanism 20 rotate in a case where a force in a rotation direction is applied by a user or the like. The revolving mechanism 22 is an example of a "rotation mechanism" according to an embodiment of the present disclosed technology.

The shift mechanism 20 is a mechanism that shifts the lens mechanism 16 and the tilt mechanism 18. The shift mechanism 20 includes the shift base 44, a shift stage 46, a shift lock 48, and a shift knob 50. A boundary 52 is a boundary between the shift base 44 and the shift stage 46. The boundary 52 is formed along a plane orthogonal to the optical axis OA. The shift mechanism 20 acts with the boundary 52 as a starting point.

The shift stage 46 is disposed closer to the image formation side than the revolving stage 38 is. The shift stage 46 is fixed to the revolving stage 38. The shift base 44 is disposed closer to the image formation side than the shift stage 46 is. The shift base 44 supports the shift stage 46 such that the shift stage 46 can shift. The meaning of "to shift" is an operation of sliding in a direction orthogonal to the optical axis direction. The shift stage 46 integrally shifts with the lens mechanism 16, the tilt mechanism 18, and the revolving stage 38. For example, a direction in which the shift stage 46 shifts (hereinafter, referred to as a "shift direction") is set to a vertical direction of the imaging apparatus 10 (refer to FIG. 1).

The shift lock 48 and the shift knob 50 are shaft-shaped members. The shift lock 48 is disposed with an axial direction of the shift lock 48 being parallel with a direction orthogonal to the optical axis direction and the shift direction. Similarly, the shift knob 50 is disposed with an axial direction of the shift knob 50 being parallel with the direction orthogonal to the optical axis direction and the shift direction. The shift lock 48 and the shift knob 50 are provided at the shift stage 46.

The shift lock 48 is a member that can switch between a locking state in which the shift stage 46 is fixed to the shift base 44 and an unlocking state in which the shift stage 46 is allowed to shift. The shift knob 50 is a member that shifts the shift stage 46. For example, a rack-and-pinion mechanism (not shown) is provided between the shift knob 50 and the shift base 44 and the shift stage 46 shifts by an amount corresponding to the amount of rotation of the shift knob 50.

The mount 24 is provided at an end portion of the lens mechanism 16 that is on the image formation side. The mount 24 is fixed to the revolving base 40. The mount 24 is attached to a mount (not shown) provided on the imaging apparatus body 14 (refer to FIG. 1). The lens device 12 is fixed to the front portion of the imaging apparatus body 14 in a case where the mount 24 is fixed to the mount provided on the imaging apparatus body 14.

Figure 5:
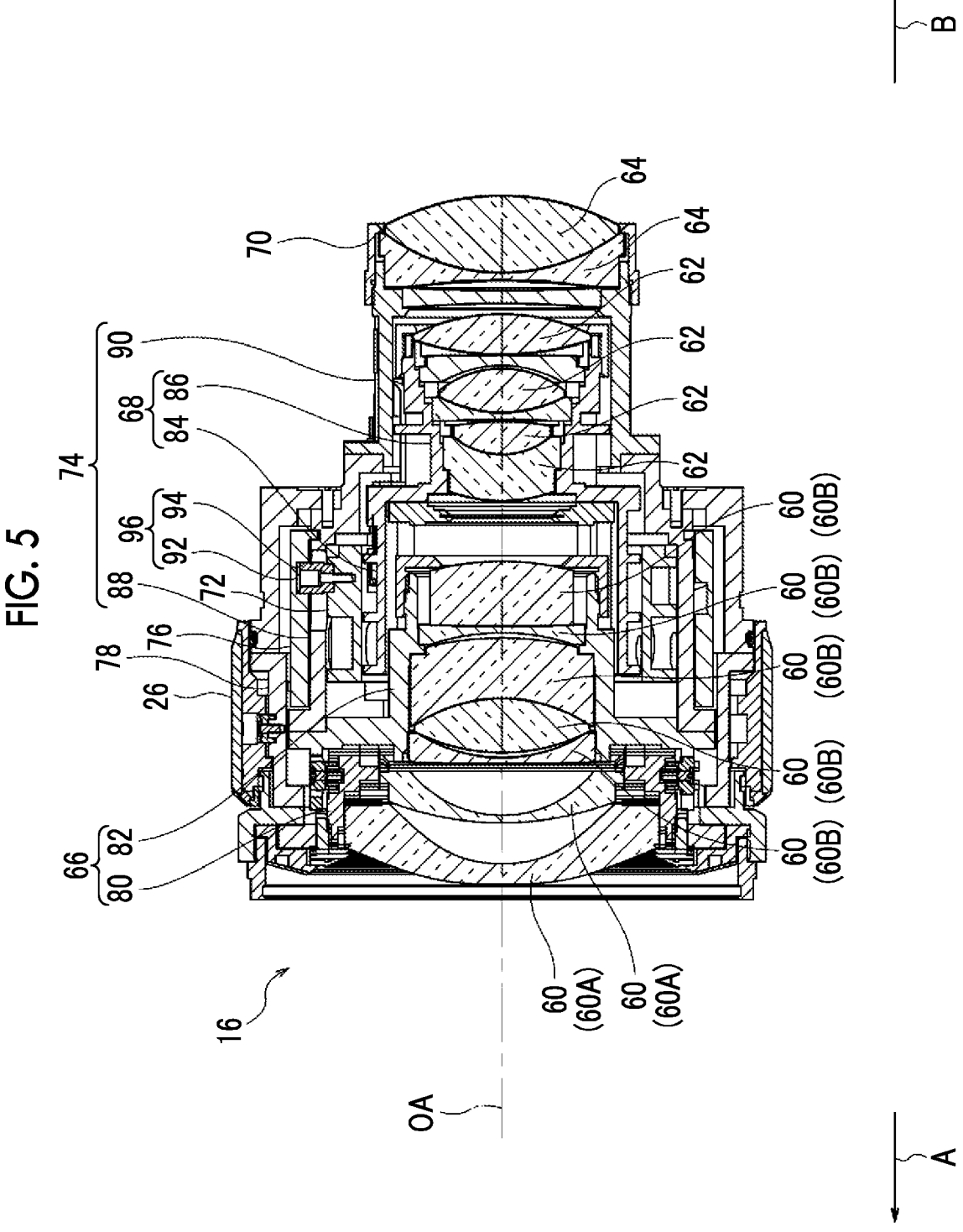
FIG. 5 is a cross-sectional view showing an example of a lens mechanism.

FIG. 5 shows a longitudinal cross-sectional view of the lens mechanism 16. For example, as shown in FIG. 5, the lens mechanism 16 includes first lenses 60, second lenses 62, third lenses 64, a first lens frame 66, a second lens frame 68, a third lens frame 70, a movement frame 72, a fixation member 74, a cam tube 76, a rotary tube 78, and a focus ring 26.

For example, the first lenses 60 are objective lenses, the second lenses 62 are focus lenses, and the third lenses 64 are fixed focal lenses. The first lenses 60 are disposed closer to the object side than the second lenses 62 are and the third lenses 64 are disposed closer to the image formation side than the second lenses 62 are.

The first lenses 60 are disposed inside the first lens frame 66, the second lenses 62 are disposed inside the second lens frame 68, and the third lenses 64 are disposed inside the third lens frame 70. In the present specification, the term "inside" means "inside in a radial direction" unless there is no description in which a direction is specified. The first lens frame 66 holds the first lenses 60, the second lens frame 68 holds the second lenses 62, and the third lens frame 70 holds the third lenses 64.

The first lens frame 66 includes a first frame 80 and a second frame 82. The first frame 80 is provided closer to the object side than the second frame 82 is. Lenses 60A, which are part of the first lenses 60 and are positioned on the object side, are disposed inside the first frame 80 and lenses 60B, which is part of the first lenses 60 and are positioned on the image formation side, are disposed inside the second frame 82.

The second lens frame 68 includes a third frame 84 and a fourth frame 86. The third frame 84 is provided closer to the object side than the fourth frame 86 is. The second lenses 62 are disposed inside the fourth frame 86. The second lenses 62 and the fourth frame 86 are disposed inside the tilt mechanism 18, the shift mechanism 20, and the revolving mechanism 22 (refer to FIG. 4).

The third frame 84 is disposed closer to the object side than the second lenses 62 are. In addition, the third frame 84 is disposed outside the second frame 82 of the first lens frame 66. In the present specification, the term "outside" means "outside in the radial direction" unless there is no description in which a direction is specified. The lenses 60B, which are part of the first lenses 60 and are positioned on the image formation side, are disposed inside the third frame 84.

The movement frame 72 is connected to an outer side of the third frame 84. The movement frame 72 is formed of, for example, a resin. The fixation member 74 includes a fixation frame 88 and a connection frame 90. The fixation frame 88 is provided closer to the object side than the connection frame 90 is. The fixation frame 88 is disposed outside the movement frame 72. The third lens frame 70 is fixed to an end portion of the connection frame 90 that is on the image formation side. The fourth frame 86 and the second lenses 62 are disposed inside the connection frame 90. The fixation member 74 is fixed to the first lens frame 66.

The cam tube 76 is disposed outside the movement frame 72 and the fixation frame 88. The rotary tube 78 is connected to an outer side of the cam tube 76 and the focus ring 26 is connected to an outer side of the rotary tube 78.

The focus ring 26, the rotary tube 78, and the cam tube 76 are supported to be rotatable around the optical axis direction with respect to the fixation member 74. In addition, the movement frame 72 and the second lens frame 68 are supported to be movable in the optical axis direction with respect to the fixation member 74.

The movement frame 72 is provided with cam shafts 92. The cam shafts 92 are shaft-shaped members extending from the movement frame 72 toward the cam tube 76. The fixation frame 88 is provided between the movement frame 72 and the cam tube 76. The cam shafts 92 penetrate the fixation frame 88 and protrude toward the cam tube 76 side with respect to the fixation frame 88. Cam grooves 94 are formed at a surface (that is, an inner peripheral surface) of the cam tube 76 that is on the fixation frame 88 side. The cam grooves 94 are formed along a spiral extending in the optical axis direction. The cam shafts 92 are engaged with the cam grooves 94.

The cam shafts 92 and the cam grooves 94 form cam mechanisms 96 that convert a force acting around the optical axis direction into a force in the optical axis direction. In a case where the focus ring 26 is operated in the rotation direction by a user or the like, the cam shafts 92 move along the cam grooves 94 as the focus ring 26 and the cam tube 76 rotate, so that the movement frame 72 and the second lens frame 68 move in the optical axis direction.

Note that although one cam mechanism 96 is shown in FIG. 5, the lens device 12 is provided with three cam mechanisms 96. That is, the number of a plurality of the cam shafts 92 is three. The three cam shafts 92 are disposed around the optical axis direction at equal intervals. The cam grooves 94 of the three cam mechanisms 96 may be independent of each other or may be connected to each other.

Figure 6:
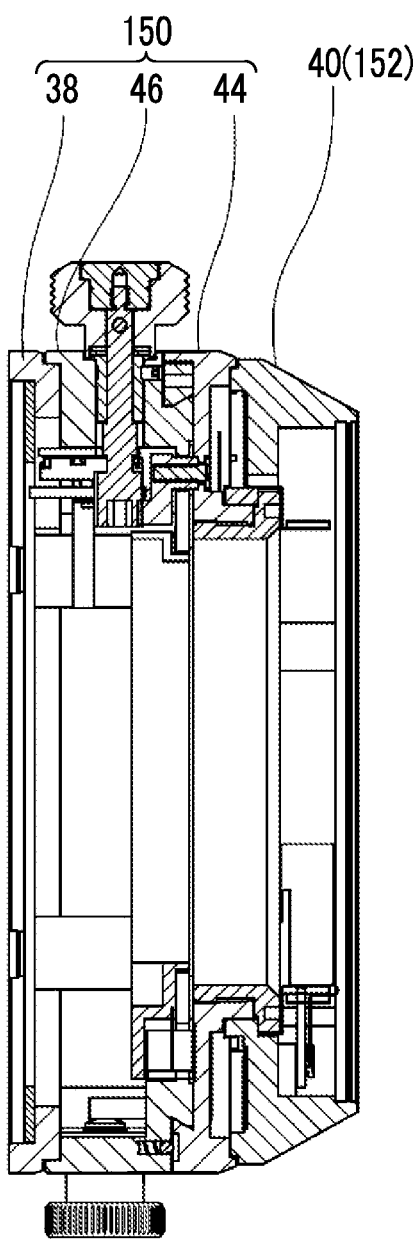
FIG. 6 is a cross-sectional view showing an example of a shift mechanism and a revolving mechanism.

FIG. 6 shows a cross-sectional view of the shift mechanism 20 and the revolving mechanism 22 which is taken along line F6-F6 of FIG. 3. For example, as shown in FIG. 6, the revolving stage 38, the shift base 44, and the shift stage 46 form a fixation portion 150. The fixation portion 150 is fixed to the lens mechanism 16 (see FIGS. 2 to 4) described above. The revolving base 40 forms a rotational movement portion 152 that is connected to the fixation portion 150 to be rotationally movable. The fixation portion 150 is an example of a "fixation portion" according to an embodiment of the present disclosed technology. The rotational movement portion 152 is an example of a "rotational movement portion" according to an embodiment of the present disclosed technology.

Figure 7:
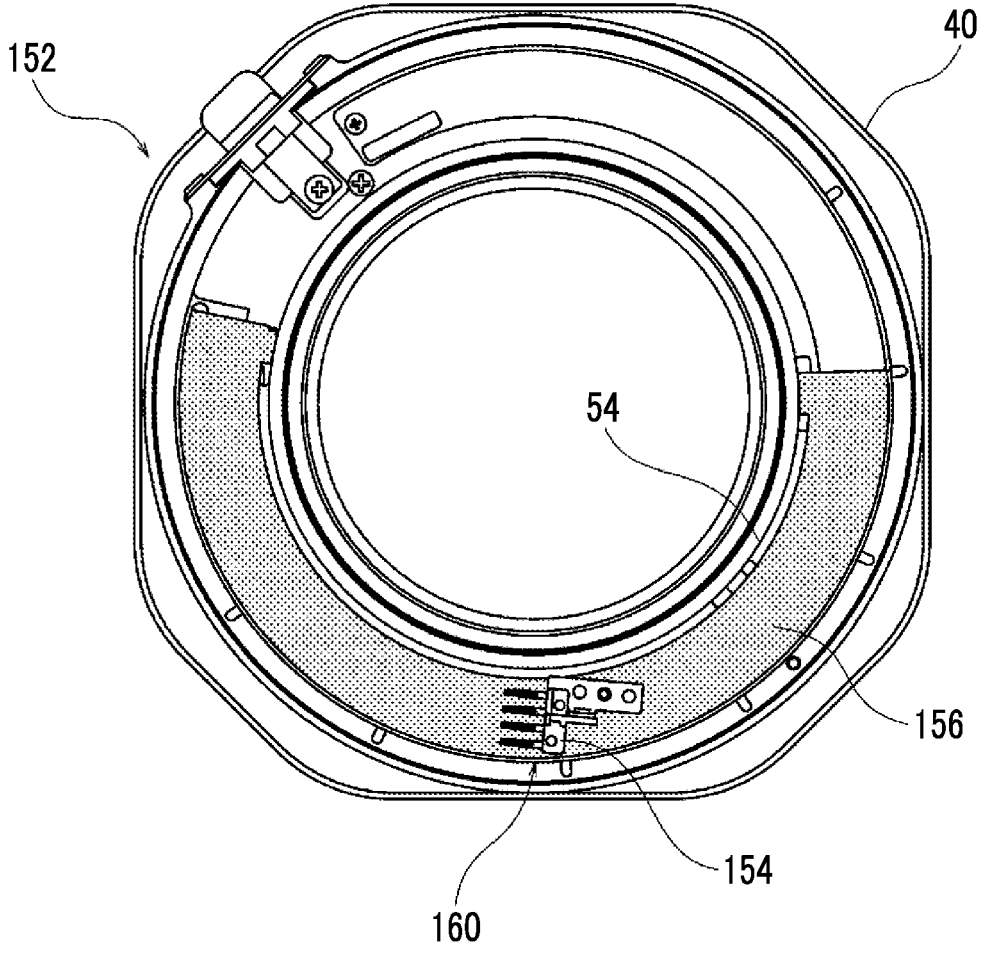
FIG. 7 is a front view showing an example of a rotational movement portion.
Figure 8:
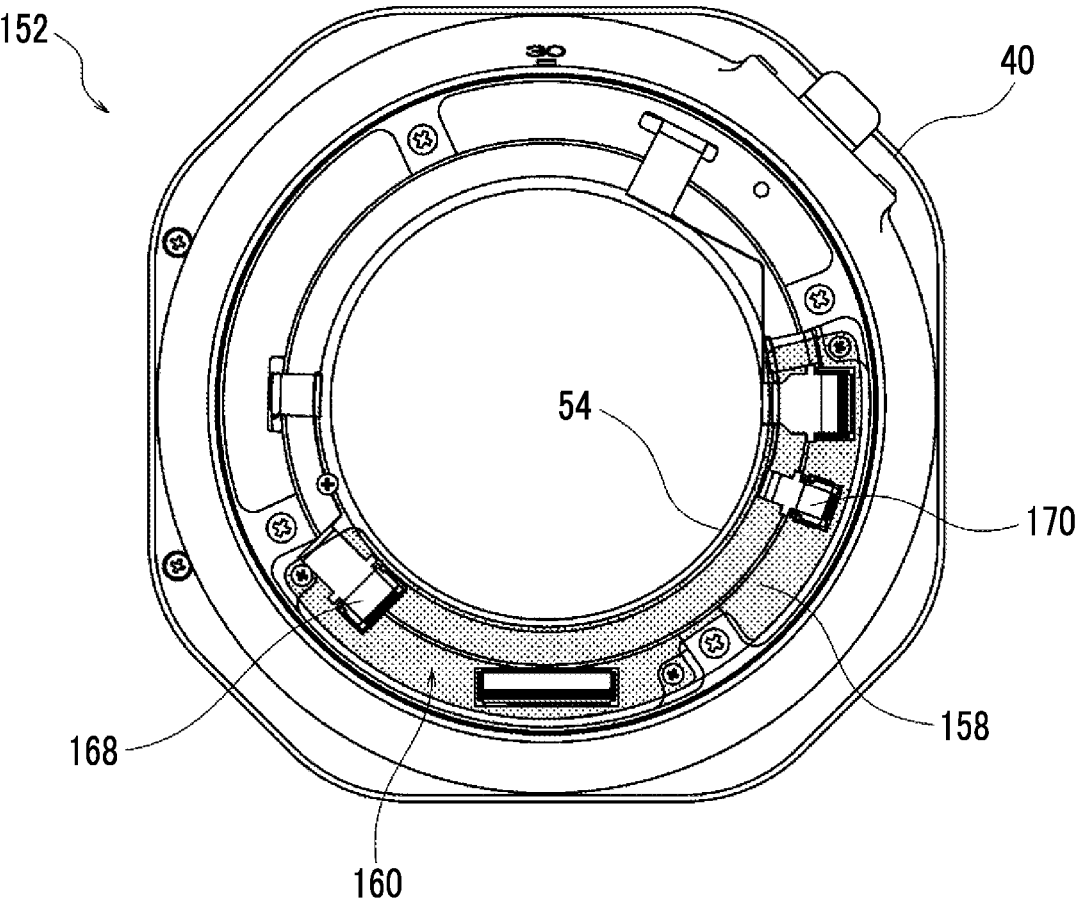
FIG. 8 is a rear view showing an example of the rotational movement portion.

FIG. 7 is a front view of the rotational movement portion 152 as seen from the object side, and FIG. 8 is a rear view of the rotational movement portion 152 as seen from the image formation side. For example, as shown in FIGS. 7 and 8, the revolving base 40 includes an annular portion 54 that is formed in an annular shape around the optical axis direction. The annular portion 54 is formed in a plate-like shape of which a plate thickness direction is parallel to the optical axis direction.

The fixation portion 150 includes a contact brush 154. The contact brush 154 is fixed to the shift base 44 (refer to FIG. 6). The rotational movement portion 152 includes a flexible substrate 156 and a substrate 158. Hereinafter, the flexible substrate 156 will be referred to as an "FPC 156". FPC is an abbreviation of "Flexible Printed Circuit".

The FPC 156 is provided closer to the object side than the annular portion 54 is, and the substrate 158 is provided closer to the image formation side than the annular portion 54 is. The FPC 156 and the substrate 158 are fixed to the revolving base 40. The contact brush 154 is disposed closer to the object side than the FPC 156 is. The contact brush 154, the FPC 156, and the substrate 158 form a rotational movement angle detection mechanism 160 that detects the angle of rotational movement of the rotational movement portion 152 with respect to the fixation portion 150. The contact brush 154 is an example of a "detection member" according to an embodiment of the present disclosed technology. The FPC 156 is an example of a "detection target member" according to an embodiment of the present disclosed technology. The substrate 158 is an example of a "substrate" according to an embodiment of the present disclosed technology.

Figure 9:
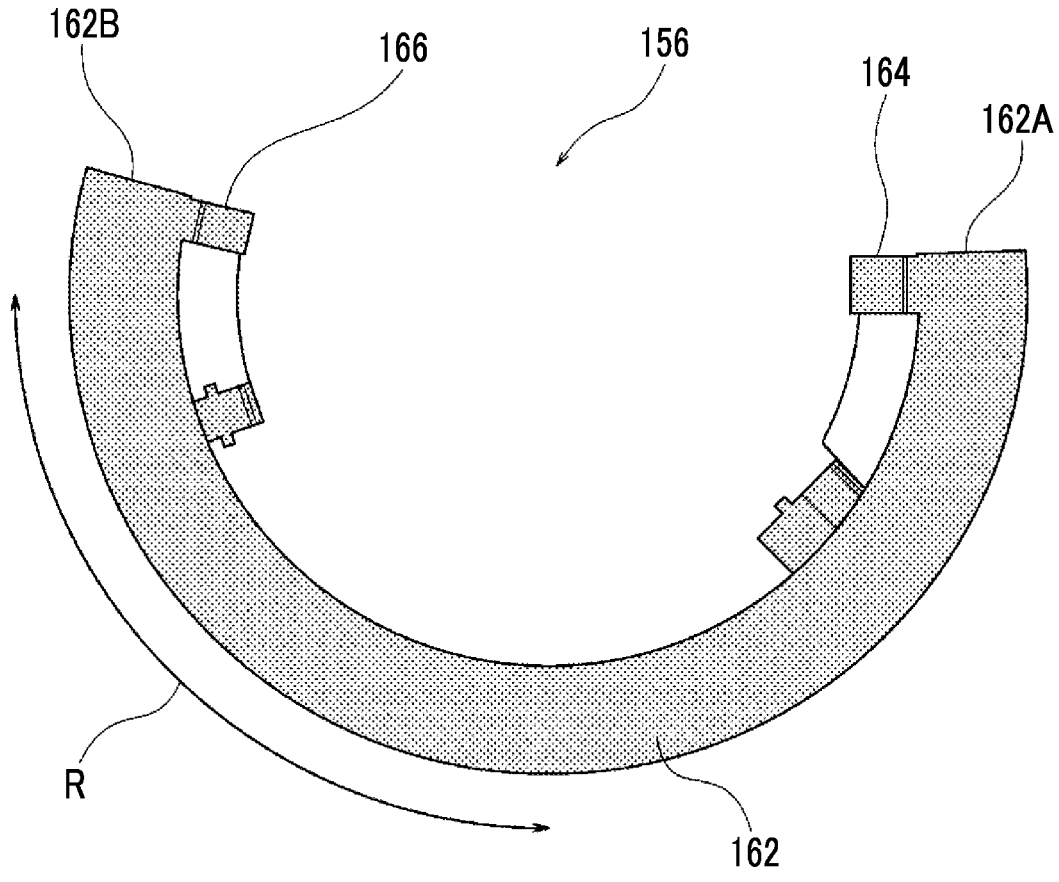
FIG. 9 is a front view showing an example of a flexible substrate.

FIG. 9 is a front view of the FPC 156 as seen from the object side. The FPC 156 includes a body portion 162, a first extending portion 164, and a second extending portion 166. The body portion 162 is formed in an arc-like shape extending in a rotational movement direction of the rotational movement portion 152 (see FIG. 7). A direction along an arrow R is the rotational movement direction of the rotary portion 152. The first extending portion 164 extends from a first end portion 162A of the body portion 162 and the second extending portion 166 extends from a second end portion 162B of the body portion 162.

The first end portion 162A is one end portion of the body portion 162 in a circumferential direction, and the second end portion 162B is the other end portion of the body portion 162 in the circumferential direction. The circumferential direction of the body portion 162 is a direction that coincides with the rotational movement direction of the rotational movement portion 152. More specifically, the first extending portion 164 and the second extending portion 166 extend to the central side of the rotational movement portion 152 from the body portion 162 (that is, the inside of the rotational movement portion 152 in the radial direction). The body portion 162 is an example of a "body portion" according to an embodiment of the present disclosed technology and the first extending portion 164 and the second extending portion 166 are examples of a "plurality of extending portions" and a "pair of extending portions" according to an embodiment of the present disclosed technology.

Figure 10:
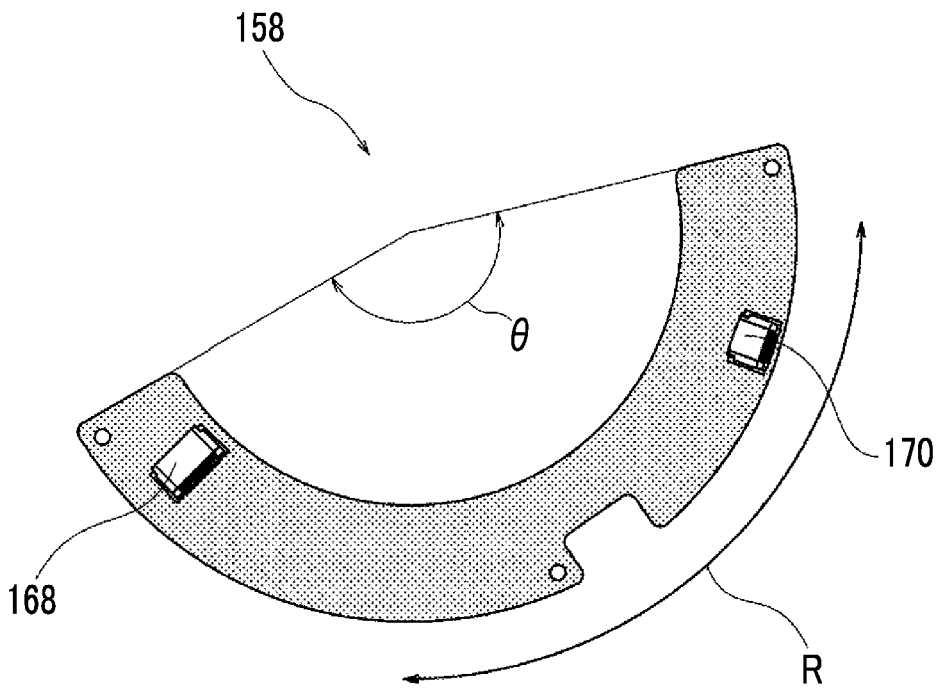
FIG. 10 is a rear view showing an example of a substrate.

FIG. 10 is a rear view of the substrate 158 as seen from the image formation side. The substrate 158 is formed in an arc-like shape extending in the rotational movement direction of the rotational movement portion 152 (refer to FIG. 7). A central angle θ of the substrate 158 is set to be equal to or smaller than 180°. For example, the substrate 158 is a printed substrate.

The first extending portion 164 and the second extending portion 166 are connected to the substrate 158. Specifically, the substrate 158 includes a first connector 168 and a second connector 170. The first connector 168 and the second connector 170 are mounted on a surface of the substrate 158 that is on the image formation side. The first connector 168 is disposed at a position corresponding to the first extending portion 164, and the second connector 170 is disposed at a position corresponding to the second extending portion 166. The first extending portion 164 is connected to the first connector 168 and the second extending portion 166 is connected to the second connector 170.

Figure 11:
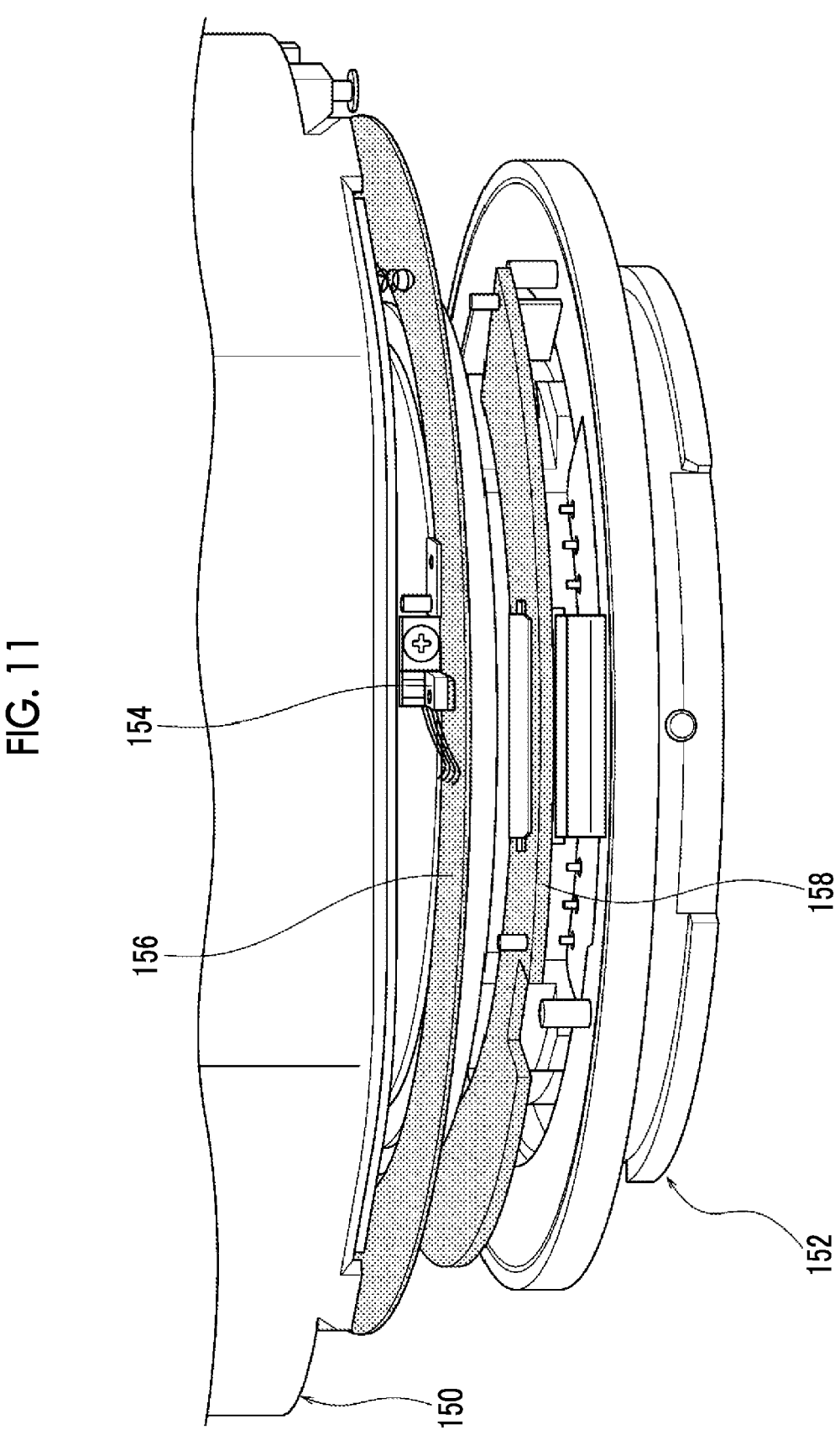
FIG. 11 is an exploded perspective view showing an example of a fixation portion and the rotational movement portion.
Figure 12:
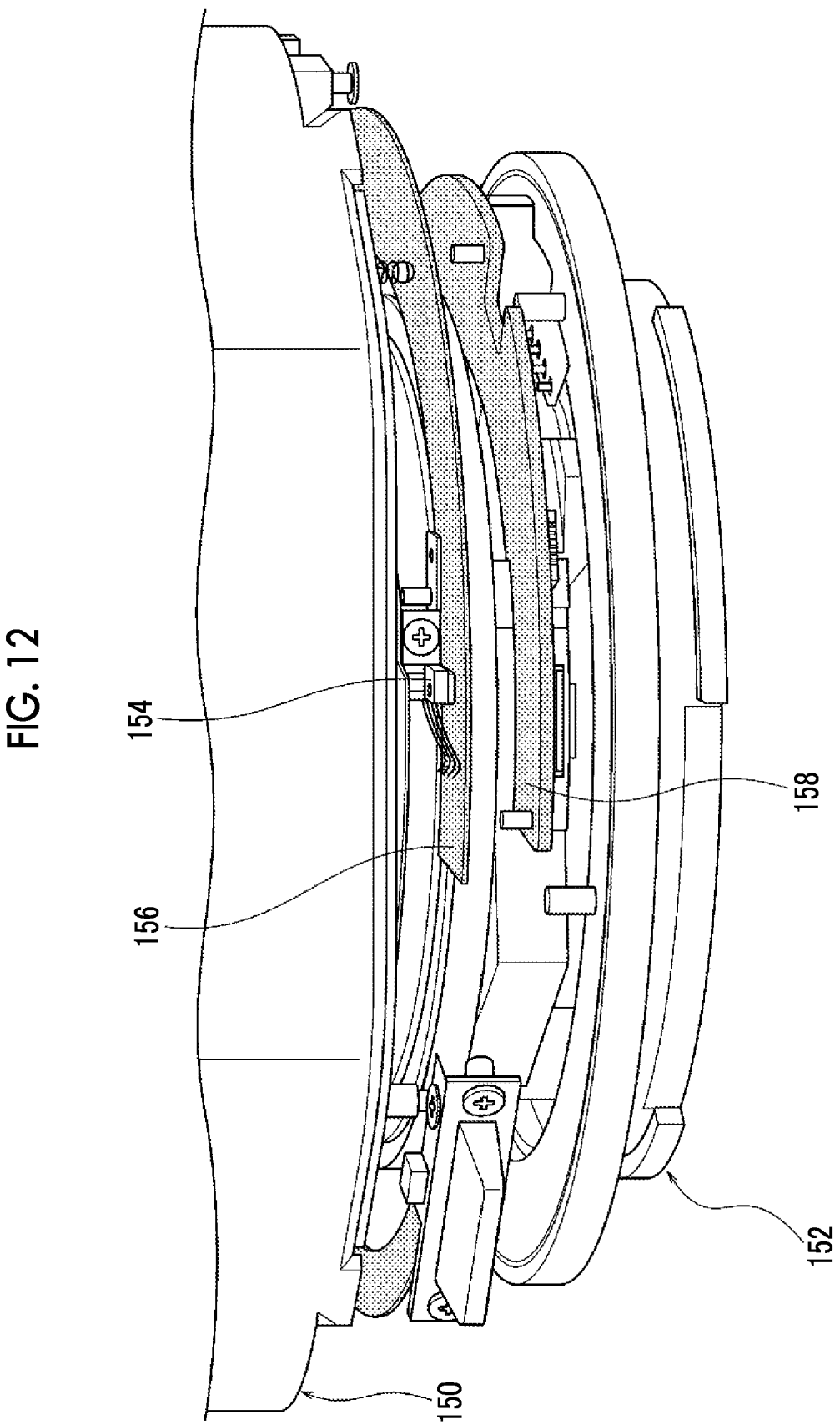
FIG. 12 is an exploded perspective view showing an example of the fixation portion and the rotational movement portion.

FIG. 11 and FIG. 12 show exploded perspective views of the fixation portion 150 and the rotary portion 152. For example, FIG. 11 shows a case where the angle of rotational movement of the rotational movement portion 152 with respect to the fixation portion 150 is 0° and FIG. 12 shows a case where the angle of rotational movement of the rotational movement portion 152 with respect to the fixation portion 150 is 90°.

An angle by which the rotational movement portion 152 is rotationally movable is set to be, for example, equal to or greater than 45° and equal to or smaller than 135°. FIG. 11 and FIG. 12 show an example in which an angle by which the rotational movement portion 152 is rotationally movable is set to 90°. The contact brush 154 is disposed at a position at which the contact brush 154 faces the FPC 156 in the optical axis direction. In addition, the contact brush 154 is disposed at a position at which the contact brush 154 overlaps with the substrate 158 within the range of rotational movement of the rotational movement portion 152 as seen in a front view from the optical axis direction. That is, the contact brush 154 is disposed at a position at which the contact brush 154 overlaps with the substrate 158 as seen in a front view from the optical axis direction regardless of the angle of rotational movement of the rotational movement portion 152.

Figure 13:
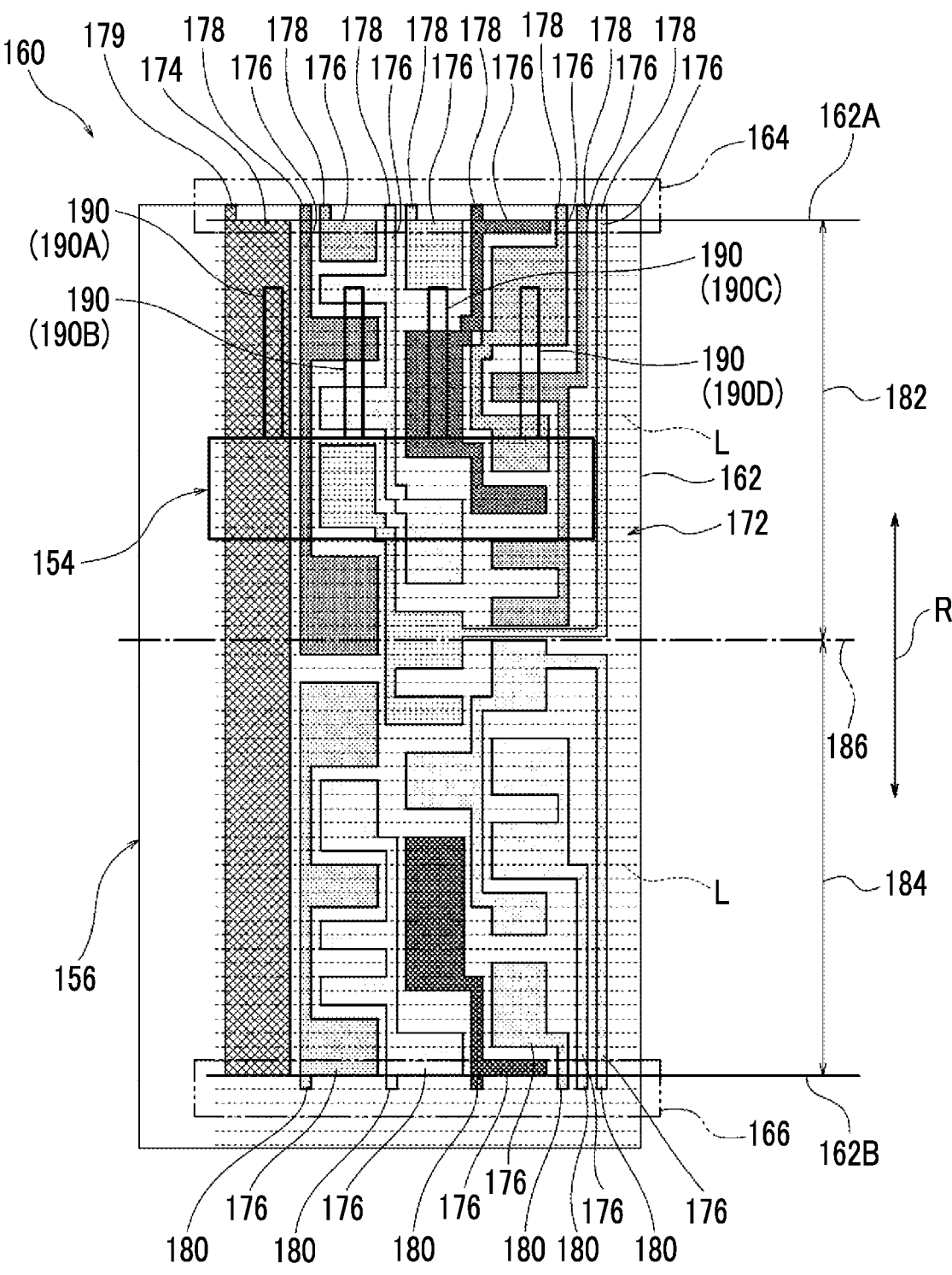
FIG. 13 is a schematic view showing an example of the state of contact between a contact brush and the flexible substrate.

FIG. 13 is a view schematically showing an example of the state of contact between the contact brush 154 and the FPC 156. In FIG. 13, the body portion 162 formed in an arc-like shape is shown in a linear shape. In addition, in FIG. 13, the first extending portion 164 and the second extending portion 166 extending from the body portion 162 are schematically shown. A direction along the arrow R is the rotational movement direction of the rotary portion 152.

The body portion 162 includes a conductor pattern 172 that is an indicator of rotational movement of the rotational movement portion 152. The conductor pattern 172 is formed on a surface of the body portion 162 that is on the object side. The conductor pattern 172 includes a ground line 174 and a plurality of signal lines 176. The ground line 174 extends linearly in the direction along the arrow R. The plurality of signal lines 176 include a plurality of signal lines 176 connected to the first extending portion 164 and a plurality of signal lines 176 connected to the second extending portion 166.

The number of the plurality of signal lines 176 connected to the first extending portion 164 is, for example, equal to or greater than six. Similarly, the number of the plurality of signal lines 176 connected to the second extending portion 166 is, for example, six or more. In an example shown in FIG. 13, the number of the plurality of signal lines 176 connected to the first extending portion 164 is eight and the number of the plurality of signal lines 176 connected to the second extending portion 166 is six. The conductor pattern 172 is a Gray-code-based pattern. That is, the ground line 174 and the plurality of signal lines 176 each have a shape corresponding to the gray code. The conductor pattern 172 is an example of an "indicator" according to an embodiment of the present disclosed technology.

The first extending portion 164 includes a plurality of first connection portions 178 that connect the plurality of signal lines 176 to the substrate 158 and the second extending portion 166 includes a plurality of second connection portions 180 that connect the plurality of signal lines 176 to the substrate 158. For example, the number of the plurality of first connection portions 178 is eight and the number of the plurality of second connection portions 180 is six. In addition, the first extending portion 164 includes a connection portion 179 that connects the ground line 174 to the substrate 158. The ground line 174 is connected to the ground (not shown) and each of the signal lines 176 is connected to a power source (not shown) via a pull-up resistor (not shown).

The body portion 162 includes a first region 182 and a second region 184. The first region 182 is a region from a boundary 186 set for the body portion 162 to the first end portion 162A and the second region 184 is a region from the boundary 186 to the second end portion 162B. For example, the boundary 186 is positioned at a central portion in the circumferential direction of the body portion 162 formed in an ark-like shape. The first extending portion 164 corresponds to the first region 182 and the second extending portion 166 corresponds to the second region 184.

The first region 182 and the second region 184 are regions that are determined based on the number of divisions of the conductor pattern 172. The meaning of "the number of divisions" is the number of divisions of the conductor pattern 172 in the rotational movement direction (that is, the direction along the arrow R) of the rotational movement portion 152. Broken lines L shown in FIG. 13 show positions at which the conductor pattern 172 is divided into a plurality of divided regions.

In each divided region, a pattern corresponding to a gray code is formed by the ground line 174 and the plurality of signal lines 176. The number of divisions of the conductor pattern 172 is set to, for example, a number equal to or greater than 30 and equal to or smaller than 62. The number of divisions can be set to 135 at the maximum. FIG. 13 shows an example in which the number of divisions of the conductor pattern 172 is set to 61, the conductor pattern 172 includes 30 divided regions in the first region 182, and the conductor pattern 172 includes 31 divided regions in the second region 184.

The contact brush 154 includes a plurality of contactors 190. The plurality of contactors 190 are electrically connected to each other. For example, the number of the plurality of contactors 190 is four. The plurality of contactors 190 are disposed at positions at which the contactors 190 come into sliding contact with the conductor pattern 172. Specifically, a first contactor 190A, which is part of the plurality of contactors 190, is disposed at a position at which the contactor comes into sliding contact with the ground line 174 and a second contactor 190B, a third contactor 190C, and a fourth contactor 190D, which are part of the plurality of contactors 190, are disposed at positions where the contactors come into sliding contact with the plurality of signal lines 176.

The rotational movement angle detection mechanism 160 having the above-described configuration operates as follows. That is, in a state where the plurality of contactors 190 are positioned in the first region 182, the state of contact between the second contactor 190B, the third contactor 190C, the fourth contactor 190D, and the plurality of signal lines 176 changes in accordance with the angle of rotational movement of the rotary portion 152 and a signal (that is, an angle detection signal) corresponding to the state of contact is output from the plurality of first connection portions 178 of the first extending portion 164.

In addition, in a state where the plurality of contactors 190 are positioned in the second region 184, the state of contact between the second contactor 190B, the third contactor 190C, the fourth contactor 190D, and the plurality of signal lines 176 changes in accordance with the angle of rotational movement of the rotary portion 152 and a signal corresponding to the state of contact is output from the plurality of the second connection portions 180 of the second extending portion 166 and part of the first connection portions 178.

For example, since the number of the plurality of first connection portions 178 is eight, an 8-bit angle detection signal is output from the first extending portion 164. In addition, since the number of the plurality of second connection portions 180 is six, a 6-bit angle detection signal is output from the second extending portion 166, for example.

Specifically, an L-level signal is output from the first connection portion 178 or the second connection portion 180 corresponding to the signal line 176 that is part of the plurality of signal lines 176 and is connected to the ground line 174 via the contact brush 154. Meanwhile, an H-level signal is output from the first connection portion 178 or the second connection portion 180 corresponding to the signal line 176 that is part of the plurality of signal lines 176 and is separated from the ground line 174 (that is, the signal line 176 that is not connected to the ground line 174 via the contact brush 154). The angle detection signal is an example of a "signal related to rotational movement" according to an embodiment of the present disclosed technology.

Next, the effects of the present embodiment will be described.

The lens device 12 according to the present embodiment includes the revolving mechanism 22 that rotates the tilt mechanism 18 and the shift mechanism 20 around the optical axis direction. Therefore, it is possible to change a direction in which the lens mechanism 16 is tilted by rotating the tilt mechanism 18 with the revolving mechanism 22. In addition, it is possible to change a direction in which the lens mechanism 16 is shifted by rotating the shift mechanism 20 with the revolving mechanism 22.

In addition, the lens device 12 includes the fixation portion 150 fixed to the lens mechanism 16 and the rotational movement portion 152 that is connected to the fixation portion 150 to be rotationally movable. The fixation portion 150 includes the contact brush 154 and the rotary portion 152 includes the FPC 156 and the substrate 158. The FPC 156 includes the body portion 162 including the conductor pattern 172, the first extending portion 164 extending from the first end portion 162A of the body portion 162, and the second extending portion 166 extending from the second end portion 162B of the body portion 162. The first extending portion 164 and the second extending portion 166 are connected to the substrate 158. Therefore, for example, the width dimension of the conductor pattern 172, and the width dimension of the body portion 162 can be made small in comparison with a structure in which one extending portion extends from the body portion 162. Accordingly, the size of the lens device 12 can be reduced in the radial direction.

In addition, the first extending portion 164 includes the plurality of first connection portions 178, and the second extending portion 166 includes the plurality of second connection portions 180. Therefore, an angle detection signal with the number of bits corresponding to the number of the plurality of first connection portions 178 can be output from the first extending portion 164, and an angle detection signal with the number of bits corresponding to the number of the plurality of second connection portions 180 can be output from the second extending portion 166.

In addition, the conductor pattern 172 is a Gray-code-based pattern. Therefore, an angle detection signal corresponding to a Gray code can be output with the state of contact between the contact brush 154 and the conductor pattern 172 changing in accordance with the angle of rotational movement of the rotary portion 152.

In addition, the contact brush 154 includes a plurality of contactors 190. The plurality of contactors 190 are electrically connected to each other. Meanwhile, the conductor pattern 172 includes the ground line 174 and the plurality of signal lines 176. The ground line 174 is connected to the ground (not shown) and each of the signal lines 176 is connected to a power source (not shown) via a pull-up resistor (not shown). Therefore, an L-level signal can be output from the first connection portion 178 or the second connection portion 180 corresponding to the signal line 176 that is part of the plurality of signal lines 176 and is connected to the ground line 174 via the contact brush 154. Meanwhile, an H-level signal can be output from the first connection portion 178 or the second connection portion 180 corresponding to the signal line 176 that is part of the plurality of signal lines 176 and is separated from the ground line 174 (that is, the signal line 176 that is not connected to the ground line 174 via the contact brush 154).

In addition, the contact brush 154 is provided at the fixation portion 150 and the FPC 156 and the substrate 158 are provided at the rotary portion 152. Here, the fixation portion 150 includes the revolving stage 38, the shift base 44, and the shift stage 46 and has a more complicated structure than the rotational movement portion 152. Therefore, since the rotary portion 152 having a simpler structure than the fixation portion 150 is provided with the FPC 156 and the substrate 158, the size of the lens device 12 can be reduced in comparison with a case where the FPC 156 and the substrate 158 are provided at the fixation portion 150, for example.

In addition, angle detection signals are output from the first extending portion 164 and the second extending portion 166. Therefore, in the imaging apparatus body 14 (refer to FIG. 1), various processes based on the angle detection signals can be performed.

In addition, the first extending portion 164 extends from the first end portion 162A of the body portion 162 and the second extending portion 166 extends from the second end portion 162B of the body portion 162. Therefore, a connection structure between the conductor pattern 172 and the plurality of first connection portions 178 and a connection structure between the conductor pattern 172 and the plurality of second connection portions 180 can be simplified in comparison with a structure in which the first extending portion 164 and the second extending portion 166 extend from between the first end portion 162A and the second end portion 162B of the body portion 162, for example. Accordingly, the size of the FPC 156 can be reduced and thus the size of the lens device 12 can be reduced.

In addition, the body portion 162 extends in the rotational movement direction of the rotary portion 152 and the first extending portion 164 and the second extending portion 166 extend to the central side of the rotational movement portion 152 from the body portion 162 (that is, the inside of the rotational movement portion 152 in the radial direction). Therefore, the FPC 156 can be restrained from projecting to the outside of the rotary portion 152 in the radial direction in comparison with a structure in which the first extending portion 164 and the second extending portion 166 extend toward a side opposite to the central side of the rotary portion 152 from the body portion 162, for example. Accordingly, the size of the lens device 12 can be reduced in the radial direction.

In addition, the contact brush 154 is disposed at a position at which the contact brush 154 overlaps with the substrate 158 within the range of rotational movement of the rotational movement portion 152 as seen in a front view from the optical axis direction. Therefore, the FPC 156 can be disposed close to the substrate 158 in comparison with a structure in which the contact brush 154 is disposed at a position offset from the substrate 158 as seen in a front view from the optical axis direction, for example. Accordingly, the lengths of the first extending portion 164 and the second extending portion 166 connecting the conductor pattern 172 and the substrate 158 to each other can be made small and thus it is possible to achieve improvement in resistance against noise.

In addition, the substrate 158 extends in the rotational movement direction of the rotary portion 152 and the central angle θ of the substrate 158 is equal to or smaller than 180°. Therefore, the size of the lens device 12 can be reduced in comparison with a case where the central angle θ of the substrate 158 is larger than 180°.

In addition, the body portion 162 includes the first region 182 and the second region 184. The first extending portion 164 corresponds to the first region 182 and the second extending portion 166 corresponds to the second region 184. Therefore, an angle detection signal corresponding to the angle of rotational movement of the rotary portion 152 can be output from the plurality of first connection portions 178 of the first extending portion 164 in a state where the contact brush 154 is positioned in the first region 182. Meanwhile, a detection signal corresponding to the angle of rotational movement of the rotary portion 152 can be output from the plurality of second connection portions 180 of the second extending portion 166 in a state where the contact brush 154 is positioned in the second region 184.

Next, modification examples of the present embodiment will be described.

Figure 14:
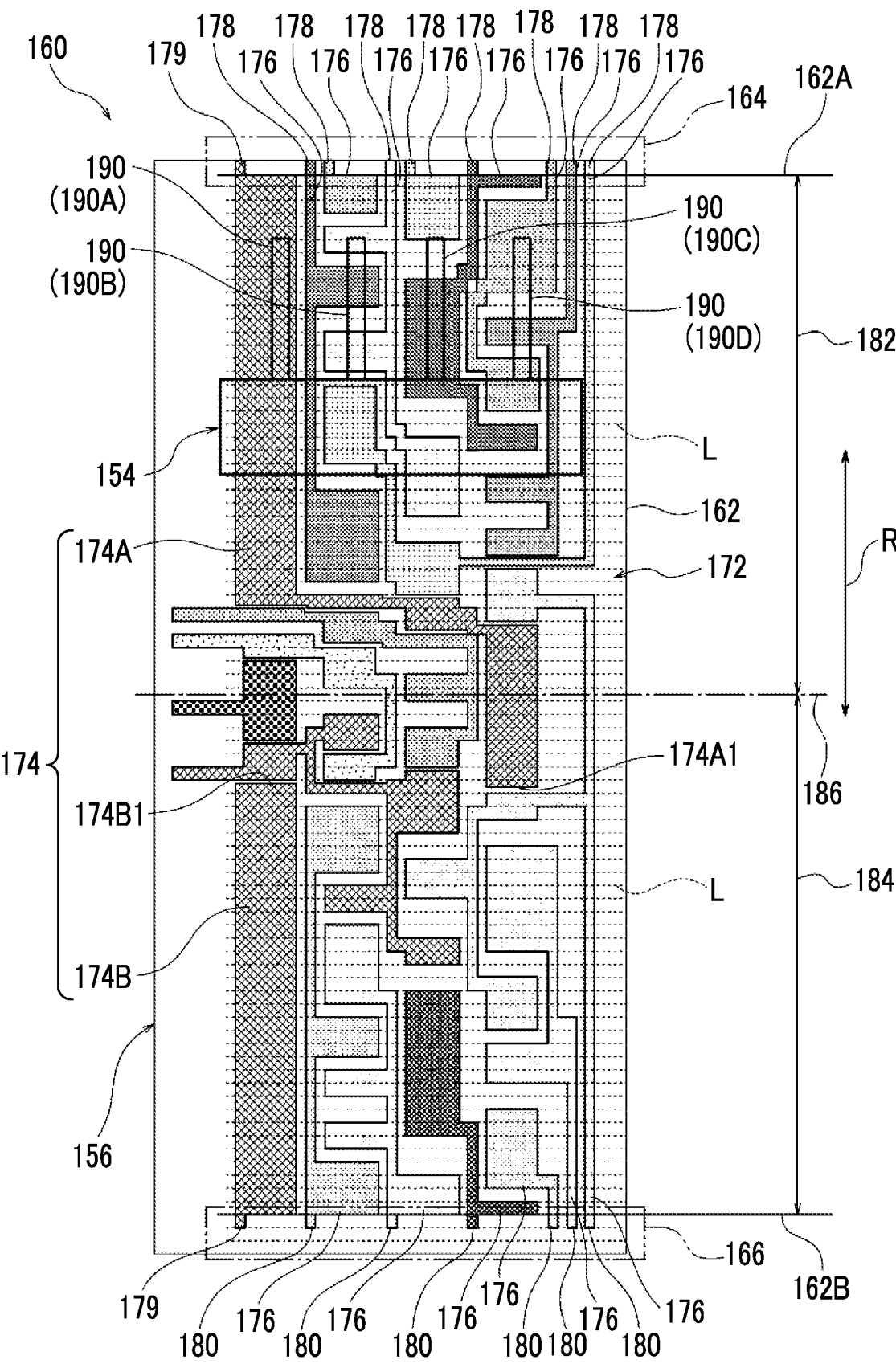
FIG. 14 is a schematic view showing a modification example of the flexible substrate.

FIG. 14 shows a modification example of the conductor pattern 172. In the modification example shown in FIG. 14, the ground line 174 is divided into a first ground line 174A and a second ground line 174B. In a case where the ground line 174 is divided into the first ground line 174A and the second ground line 174B in such a manner, the number of divisions of the conductor pattern 172 can be increased in comparison with a case where the conductor pattern 172 includes one linearly extending ground line 174 as in an example shown in FIG. 13, for example. Accordingly, it is possible to increase resolution in the case of detection of the angle of rotational movement of the rotary portion 152.

In addition, in the example shown in FIG. 14, a portion 174A1 of the first ground line 174A and a portion 174B1 of the second ground line 174B overlap with each other in the direction along the arrow R. Note that, similarly to the ground line 174, any of the plurality of signal lines 176 may be divided into first and second signal lines and the first and second signal lines may partially overlap with each other in the direction along the arrow R.

In a case where the first and second signal lines partially overlap with each other in the direction along the arrow R and the contact brush 154 partially comes into contact with the first and second signal lines, an L-level signal can be output from the first connection portion 178 corresponding to the first signal line or the second connection portion 180 corresponding to the second signal line as with a state where the contact brush 154 is in contact with the ground line 174.

The first ground line 174A is an example of a "first line" according to an embodiment of the present disclosed technology and the second ground line 174B is an example of a "second line" according to an embodiment of the present disclosed technology. The first signal line is an example of a "first line" according to an embodiment of the present disclosed technology and the second signal line is an example of a "second line" according to an embodiment of the present disclosed technology.

In addition, in the above-described embodiment, the fixation portion 150 includes the contact brush 154 and the rotary portion 152 includes the FPC 156 and the substrate 158. However, the fixation portion 150 may include the FPC 156 and the substrate 158 and the rotary portion 152 may include the contact brush 154.

In addition, in the above-described embodiment, the contact brush 154 is used. However, a member having the same function as the contact brush 154 may also be used.

In addition, in the above-described embodiment, the conductor pattern 172 is provided on the FPC 156. However, the conductor pattern 172 may be provided on a constituent member other than the FPC 156.

In addition, in the above-described embodiment, the FPC 156 is used. However, a member having the same function as the FPC 156 may also be used.

In addition, in the above-described embodiment, the FPC 156 includes the first extending portion 164 and the second extending portion 166. However, the number of extending portions that the FPC 156 includes may be equal to or greater than three.

In addition, in the above-described embodiment, the first extending portion 164 extends from the first end portion 162A of the body portion 162. However, the first extending portion 164 may extend from another portion of the body portion 162 other than the first end portion 162A. Similarly, the second extending portion 166 extends from the second end portion 162B of the body portion 162. However, the second extending portion 166 may extend from another portion of the body portion 162 other than the second end portion 162B.

In addition, in the above-described embodiment, the first extending portion 164 and the second extending portion 166 extend toward the central side of the rotary portion 152 from the body portion 162. However, the first extending portion 164 and the second extending portion 166 may extend to a side other than the central side of the rotary portion 152 from the body portion 162.

In addition, in the above-described embodiment, the contact brush 154 is disposed at a position at which the contact brush 154 overlaps with the substrate 158 within the range of rotational movement of the rotational movement portion 152 as seen in a front view from the optical axis direction. However, the contact brush 154 may be disposed at a position offset from the substrate 158 as seen in a front view from the optical axis direction.

In addition, in the above-described embodiment, the revolving mechanism 22 is a mechanism that rotates the tilt mechanism 18 and the shift mechanism 20 around the optical axis direction. However, the revolving mechanism 22 may be a mechanism that rotates any one of the tilt mechanism 18 or the shift mechanism 20 around the optical axis direction.

In addition, in the above-described embodiment, the lens device 12 includes the tilt mechanism 18, the shift mechanism 20, and the revolving mechanism 22. However, at least one of the tilt mechanism 18, the shift mechanism 20, or the revolving mechanism 22 may be omitted.

Contents described and illustrated above are for detailed description of a part according to the present disclosed technology and are merely an example of the present disclosed technology. For example, description of the above-described configurations, functions, actions, and effects is description related to an example of configurations, functions, actions, and effects of a part according to the present disclosed technology. Therefore, it is a matter of course that an unnecessary part of the contents described and illustrated above may be deleted, a new element may be added, and replacement may be made without departing from the spirit of the present disclosed technology. In addition, in order to avoid complication and facilitate the understanding of a portion according to the present disclosed technology, regarding the contents described and illustrated above, description related to common technical knowledge or the like which does not need to be described to enable implementation of the present disclosed technology has been omitted.

All publications, patent applications, and technical standards described in the present specification are incorporated herein by reference to the same extent as if each publication, patent application, or technical standard was specifically and individually indicated to be incorporated by reference.

What is claimed is:

1. A lens device comprising:
a fixation portion fixed to a lens mechanism; and
a rotational movement portion that is connected to the fixation portion to be rotationally movable,
wherein one of the fixation portion and the rotational movement portion includes a detection member,
the other of the fixation portion and the rotational movement portion includes a detection target member and a substrate,
the detection target member includes a body portion including an indicator of rotational movement and a plurality of extending portions extending from the body portion, and
the plurality of extending portions are connected to the substrate.

2. The lens device according to claim 1,
wherein the detection member includes a contact brush,
the detection target member includes a flexible flat cable,
the indicator includes a conductor pattern that comes into sliding contact with the contact brush, and
each of the extending portions includes a connection portion that connects the conductor pattern to the substrate.

3. The lens device according to claim 2,
wherein the conductor pattern is a Gray-code-based pattern.

4. The lens device according to claim 2,
wherein the conductor pattern includes a ground line and a plurality of signal lines.

5. The lens device according to claim 1,
wherein the fixation portion includes the detection member, and
the rotational movement portion includes the detection target member and the substrate.

6. The lens device according to claim 1,
wherein the plurality of extending portions include a pair of extending portions that outputs a signal related to the rotational movement.

7. The lens device according to claim 6,
wherein a first extending portion of the pair of extending portions extends from a first end portion of the body portion, and a second extending portion of the pair of extending portions extends from a second end portion of the body portion.

8. The lens device according to claim 1,
wherein the body portion extends in a rotational movement direction of the rotational movement portion, and
the plurality of extending portions extend to a central side of the rotational movement portion from the body portion.

9. The lens device according to claim 1,
wherein the detection member is disposed at a position at which the detection member overlaps with the substrate within a range of rotational movement of the rotational movement portion as seen in a front view from an optical axis direction.

10. The lens device according to claim 1,
wherein the substrate extends in a rotational movement direction of the rotational movement portion, and
a central angle of the substrate is equal to or smaller than 180°.

11. The lens device according to claim 1,
wherein the detection target member includes a first region and a second region, and
the plurality of extending portions include a first extending portion corresponding to the first region and a second extending portion corresponding to the second region.

12. The lens device according to claim 11,
wherein the first region and the second region are determined based on the number of divisions of the indicator.

13. The lens device according to claim 12,
wherein the number of divisions is equal to or greater than 30 and equal to or smaller than 62.

14. The lens device according to claim 1,
wherein an angle by which the rotational movement portion is rotationally movable is equal to or greater than 45° and equal to or smaller than 135°.

15. The lens device according to claim 1,
wherein an angle by which the rotational movement portion is rotationally movable is 90°.

16. The lens device according to claim 2,
wherein the conductor pattern includes a ground line and a plurality of signal lines, and
the ground line or the signal line is divided into a first line and a second line.

17. The lens device according to claim 16,
wherein the first line and the second line partially overlap with each other in a rotational movement direction of the rotational movement portion.

18. The lens device according to claim 1, further comprising:
the lens mechanism;
a tilt mechanism that tilts the lens mechanism;
a shift mechanism that shifts the lens mechanism; and
a rotation mechanism that rotates at least one of the tilt mechanism or the shift mechanism around an optical axis direction.

* * * * *